United States Patent [19]

Oka

[11] Patent Number: 4,882,582

[45] Date of Patent: Nov. 21, 1989

[54] TOUCH PANEL INPUT DEVICE

[75] Inventor: Minoru Oka, Toyota, Japan

[73] Assignee: Hitachi, Ltd., Tokyo, Japan

[21] Appl. No.: 120,880

[22] Filed: Nov. 16, 1987

[30] Foreign Application Priority Data

Nov. 18, 1986 [JP] Japan .................. 61-274426

[51] Int. Cl.⁴ .................. G09G 1/00; H03K 17/968
[52] U.S. Cl. .................. 341/23; 340/712; 250/221
[58] Field of Search .............. 340/712, 365 V, 365 L, 340/365 P; 341/23, 31; 250/221, 222.1

[56] References Cited

U.S. PATENT DOCUMENTS

| | | | |
|---|---|---|---|
| 4,251,816 | 2/1981 | Eppley | 340/722 |
| 4,341,197 | 7/1982 | Butts | 340/365 S |
| 4,451,895 | 5/1984 | Sliwkowski | 340/712 |

FOREIGN PATENT DOCUMENTS 60-262235 12/1985 Japan .

OTHER PUBLICATIONS

"Manipulating Simulated Objects with Real-World Gesture . . . " by Margaret R. Minsky, Computer Graphics, vol. 18, No. 3, Jul. 1984.

Primary Examiner—Donald J. Yusko
Assistant Examiner—Tyrone Queen
Attorney, Agent, or Firm—Kenyon & Kenyon

[57] ABSTRACT

A transparent touch panel mounted on the screen of a display CRT of an automatic transaction device used for banking business detects push down of one of keys displayed on the screen. Among a number of keys displaying an operation manual and numbers, those which are to be pushed down by an operator are displayed with an emphasis so that the operator can recognize them easily.

13 Claims, 6 Drawing Sheets

TOUCH PANEL INPUT DEVICE

CROSS-REFERENCE TO RELATED APPLICATIONS

This application relates to a U.S. application, Ser. No. 55547 filed May 29, 1987, now U.S. Pat. No. 4,812,833, taking advantage of the priority based on Japanese Patent Application No. Sho 61-123304.

BACKGROUND OF THE INVENTION

This invention relates to a touch panel input device and in particular to a touch panel input device permitting an improvement in the operability thereof for its operator.

For a recycle type ATM (Automated Teller Machine), etc. in a banking system, a method for inputting necessary information by means of a keyboard is adopted and keys on the keyboard are changed more and more fromm conventional push button type keys to keys by means of a touch panel.

By this input method of using a touch panel erroneous inputs may happen due to parallax and due to the narrowness of the input area. Further, since it is difficult for the operator to select keys, the objects of input, when the number of keys to be defined is increased on the screen, where the keys are displayed, various methods have been proposed to make the operator confirm the input area in order to prevent erroneous inputs among those methods are the use of a click sound and a variation in color of the keys to be pushed down.

For example, by the method disclosed in JP-A-No. 60-262235, when a user pushes down a key on the touch panel the color of the display area corresponding to the key pushed down on the display screen is varied so that the user can confirm the key pushed down.

According to the prior art techniques, emphasis is laid on the positional confirmation of the key which has been pushed down, and the positional indication of a number of keys, which can be pushed down, is displayed together with an operation manual.

SUMMARY OF THE INVENTION

Consequently an object of this invention is to provide a touch panel input device improved in the operability of the key input, in which it is easy to find the position of the key to be pushed down on the display screen.

Another object of this invention is to provide a touch panel input device, in which it is easy for the operator to recognize the position of the keys, which are the object of input, before the input operation is completed, thus preventing erroneous inputs and improving the operability of the device.

In order to achieve the objects described above, a touch panel input device according to the present invention is provided with means for displaying an image, including letters, and input keys superposed on the display means and made of a transparent material, in which the image, including letters, is displayed at the position corresponding to the arrangement of the keys on the screen of a CRT display device. The input keys are activated by an operator by pushing down on the display in an area corresponding to a desired key. The touch panel input device includes further means for displaying the part of the image corresponding to keys that are effective for a specific operation in a manner different from that for the remaining part of the image corresponding to the keys which are not effective for a specific operation so that the part of the image corresponding to effective keys, is displayed in a manner different from that for the remaining part of image corresponding to the non-effective keys prior to the activation of keys by the operator in order to make the operator recognize effective keys.

According to this invention, the operator can easily confirm the position, of a key which he desires to activate, so that an erroneous input is prevented, because the input device displays that part of the image, which is the object to be pushed down, in a color different from that of the other non-effective part or parts, by blinking, for example the effective part in the display on the screen, before an input is effected by the operator.

DESCRIPTION OF THE PREFERRED EMBODIMENTS

Figure 1:
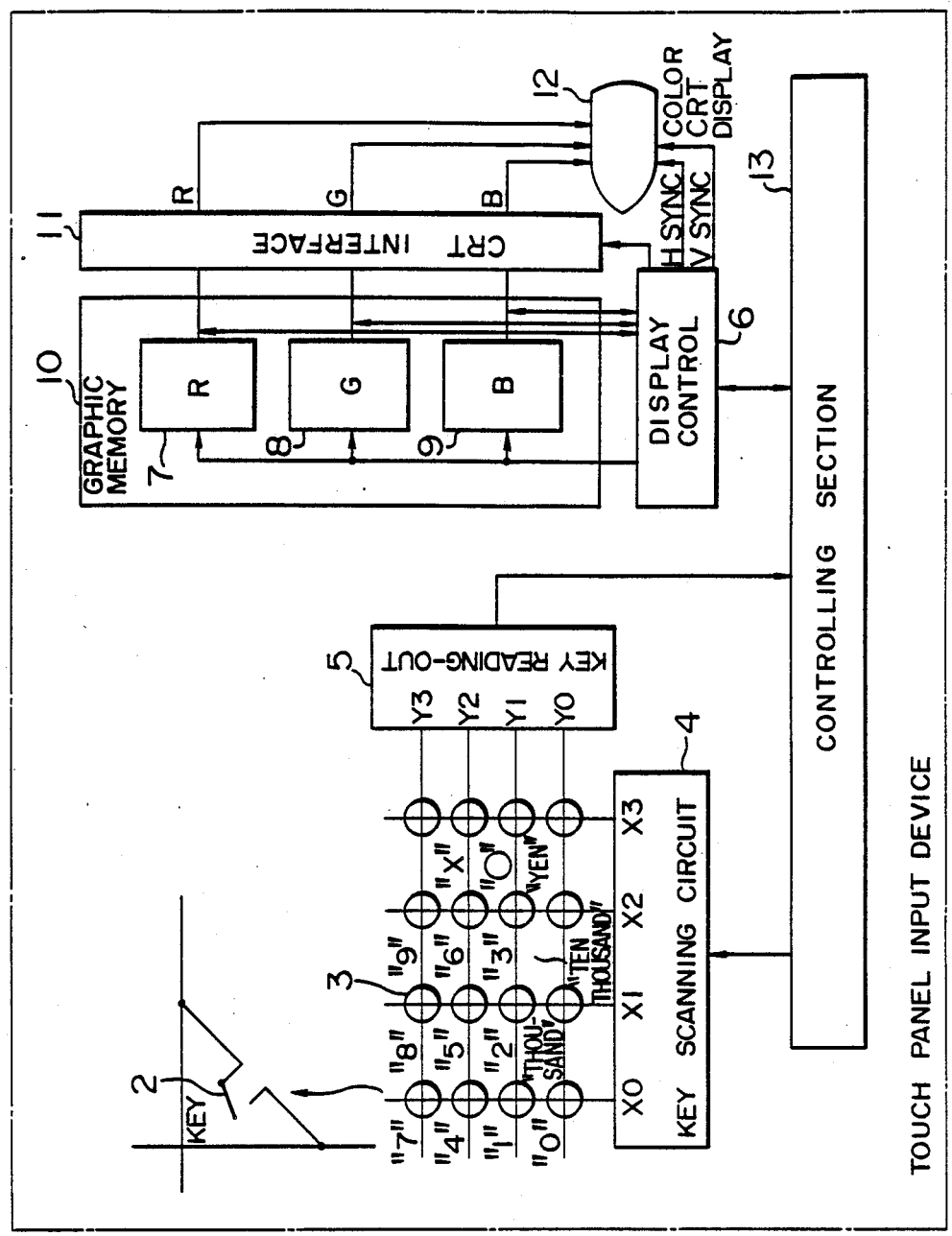
FIG. 1 is a block diagram illustrating the construction of the touch panel input device according to an embodiment of the present invention.

The touch panel input device in this embodiment is provided with a key matrix 3 consisting of keys 2, a key scanning circuit 4, a key reading-out circuit 5, a display controlling circuit 6, graphic memories 7-10, a CRT interface circuit 11, a color CRT display 12 and a controlling section 13, as indicated in FIG. 1. The controls section 13 controlling the whole device.

The key matrix 3 is constituted by 4 lines×4 rows of keys 2. The key scanning circuit 4 controls the keys 2 while scanning them. The key reading-out circuit 5 controls the reading-out of the keys 2. The key scanning operation is described in the U.S. patent application, Ser. No. 55547 now U.S. Pat. No. 4,812,833.

Further the color CRT display 12 displays the arrangement of the keys 2. The display controlling circuit 6 and the interface circuit for CRT 11 control the display.

Furthermore the graphic memory 10 has a memory capacity corresponding to the number of dots to be displayed in the color CRT display 12 and includes 3 graphic memories 7, 8 and 9 corresponding to red, green and blue (hereinbelow abbreviated to R, G and B), respectively.

By such a construction the arrangement of the keys in a touch panel 22 is displayed on the screen 21 of the color CRT display 12. Further this touch panel 22 is constituted by a key matrix corresponding to the key matrix 3 consisting electrically of 4 lines×4 rows of the keys 2. Since the arrangement of the keys in the touch panel 22 and that in the key matrix 3 correspond to each other, the controlling section 13 discriminates the switched-on key after having read-out key data from the key reading-out circuit 5 and decoded them by scanning X0 to X3 successively in the key scanning circuit 4, as indicated in FIG. 1.

In order to carry out the display corresponding to the arrangement of the keys in this touch panel 22, the controlling section 13 stores the data to be displayed in the graphic memory 10 having a memory capacity corresponding to the number of dots to be displayed on the screen 21 through the display controlling circuit 6. The graphic memory 10 stores "0" in a bit corresponding to a letter including a letter frame indicating an area of one key and "1" in all the other bits for the R graphic memory 7 and the B graphic memory 9 and "1" in all the bits for the G graphic memory 8 in order to display the ground in white and the letters in green, and displays them on the color CRT 12 through the CRT interface circuit 11.

In this way, according to the indication on the screen 21 of the color CRT display 12, in order to indicate clearly the position of the keys, which are objects to be pushed down by the operator, among an number of keys 2 that include function keys, number keys, etc., to be activated when he pushes down one of the keys 2 (FIG. 1) in the touch panel 22, the letters and the letter frames, which are objects to be pushed down because they are effective keys, are to him by blinking.

That is, in the R graphic memory 7 and the B graphic memory 9 of the graphic memory 10 "1" and "0" are stored alternately with a predetermined time interval for the key objects or "letters" "0 to 9, thousand, ten thousand, and Yen" and "0" is stored for all the other bits. Further, in the G graphic memory 8 "1" is stored for all the bits. In this way all the key objects are indicated in green on the screen 21 and in particular the "letters" "0 to 9, ten thousand, thousand, and Yen" are indicated by blinking. Consequently the operator can recognize the effective keys to be pushed down before the effective input.

According to another embodiment another display method for emphasizing the letter keys, which are effective, consists in varying the color of the "letters" to emphasize ones that are effective from the others which are not effective. This variation can be realized under the control of the controlling section 13.

According to still another embodiment, a method for emphasizing the "letter" keys in a region, where one of the keys is to be pushed down consists in increasing the size and the thickness by doubling them so that the operator can recognize the keys to be pushed down in the operation step at that time among the keys on the display screen.

Figure 2A:
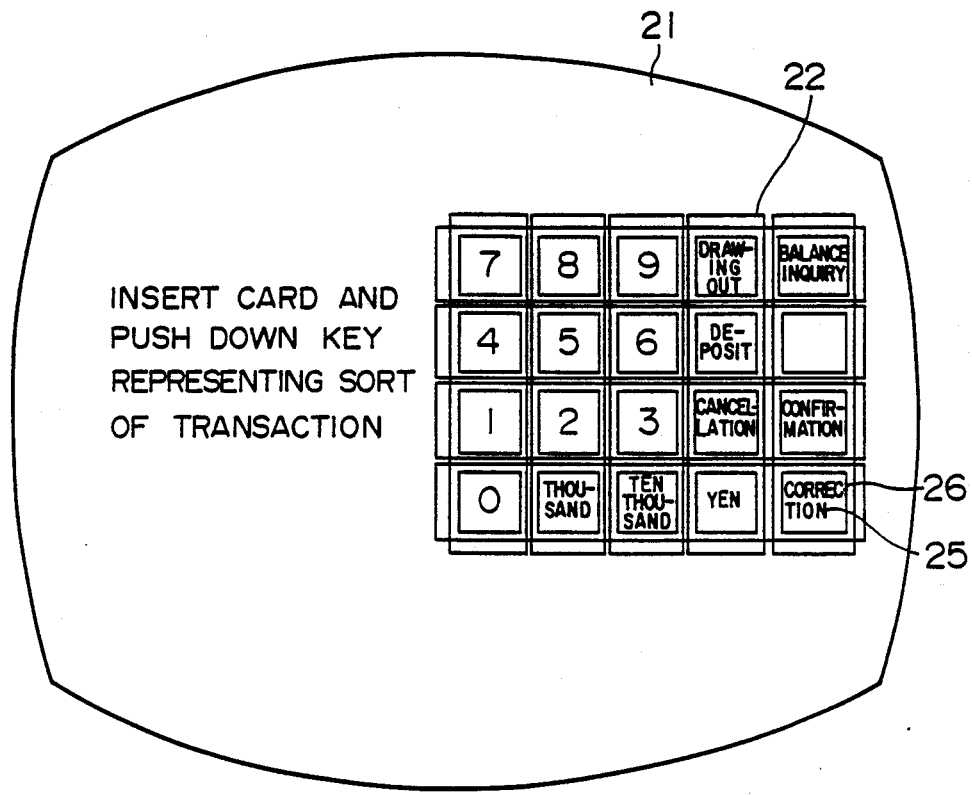
FIGS. 2A, 2B and FIGS. 3A-3C show different images on the screen of a CRT display according to an embodiment of the present invention.
Figure 2B:
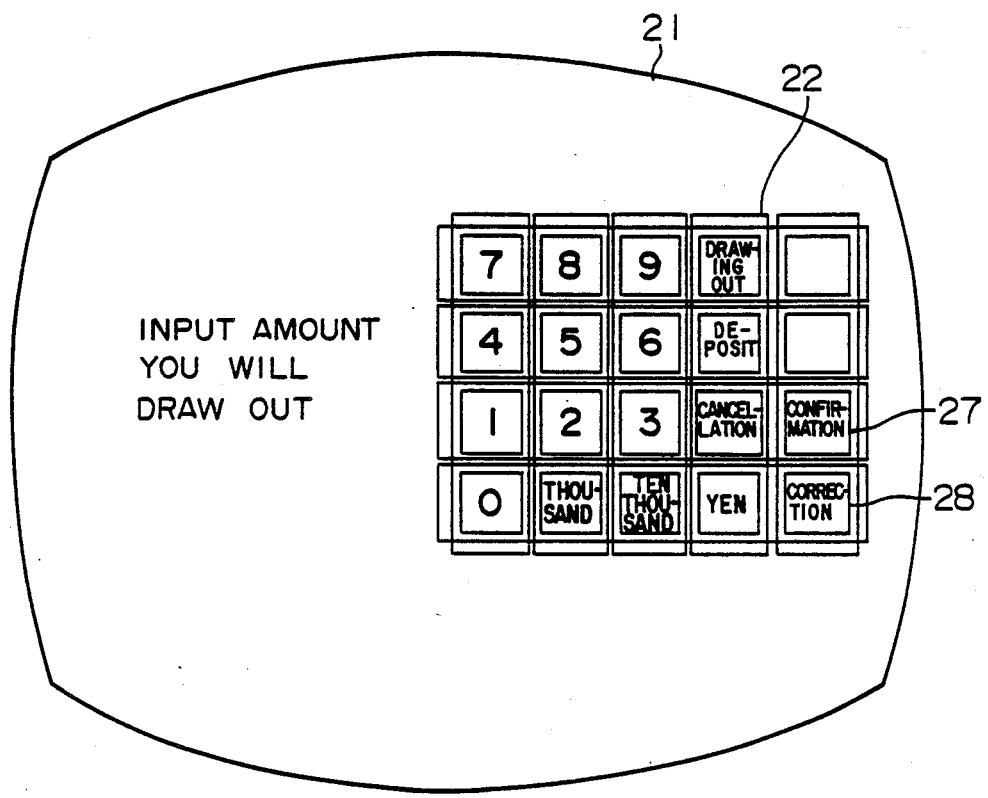

When an operator, who wants to draw out cash, inserts his magnetic card into the inlet disposed on the touch panel input device, the device demands him to input his identification number by means of the ten keys in order to confirm that he is the legal owner of the card. When the inputted identification number is in accordance with the number stored within the device, the procedure proceeds to the step to set the amount indicated in FIG. 2B. For this step, contrary to the display step indicated in FIG. 2A, it is necessary to emphasize the ten number keys 10-9, and the units of the amount for the operator. While FIG. 2A indicates the emphasis by blinking, FIG. 2B shows an embodiment, in which the operator recognizes the effective keys for the operation by displaying thick letters. According to still another embodiment it is possible to emphasize the keys which are effective by changing the rectangular frames to circular ones.

The amount corresponding to the keys, which the operator has pushed down, is displayed in numerals at the side of or above or below the arrangement of the keys and the operator pushes down a confirmation key 27 after having confirmed the amount. If the displayed amount is not correct, he pushes down a correction key 28 and repeats the input of the amount. When he wants to interrupt the transaction with the device, he pushes down a cancellation key. Then the card is returned and the device goes back to its normal waiting state indicated in FIG. 2A.

Figure 3A:
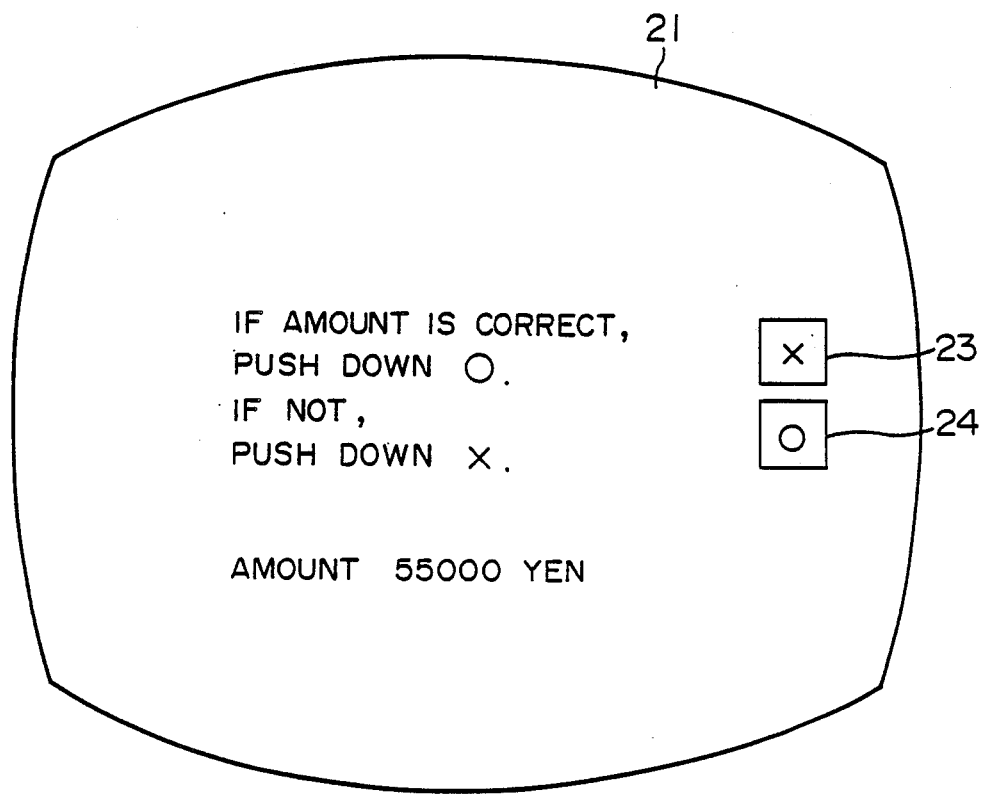

Furthermore, as indicated in FIG. 3A, when an operator inputs data by means of keys, it is necessary to display many information texts, and in the case where it is difficult for the operator to recognize the keys, which are objects to be pushed down, keys 23 and 24 are emphasized similarly by blinking.

Figure 3B:
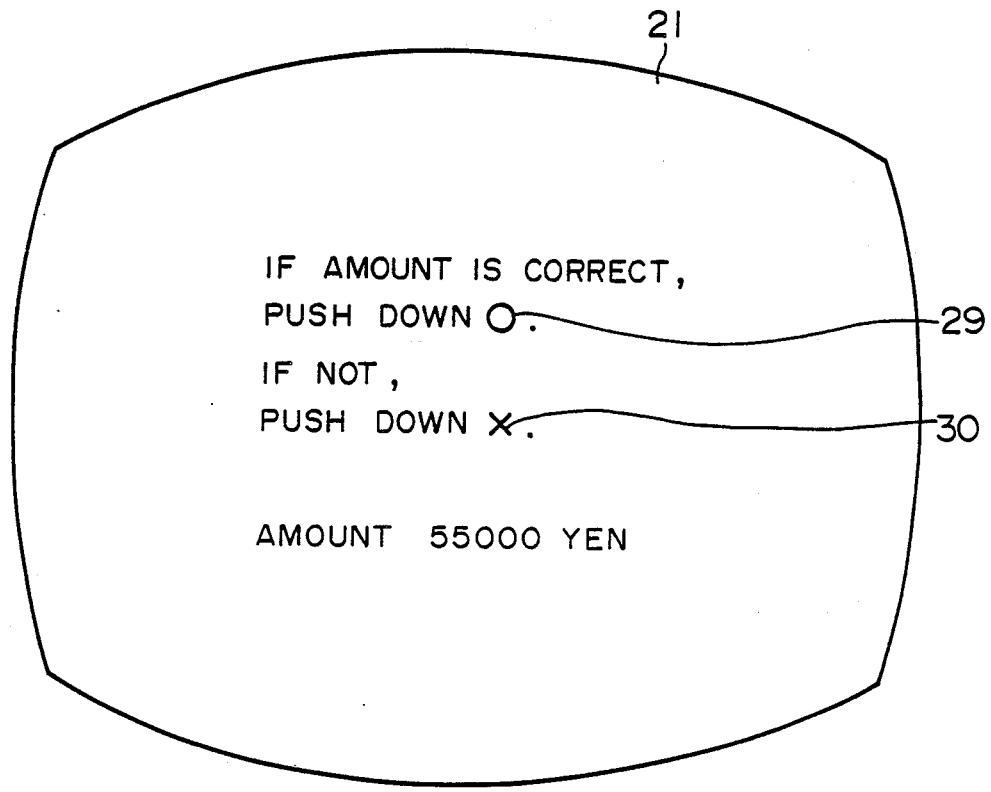

FIG. 3B shows still another embodiment, in which a circle 29 and a cross 30 representing YES and NO, respectively, are displayed with thick strokes in order to emphasize signs or words to be selected in a displayed information sentence.

When the operator touches the display position of the cross 30, the procedure returns again to the step, where the amount is inputted.

Figure 3C:
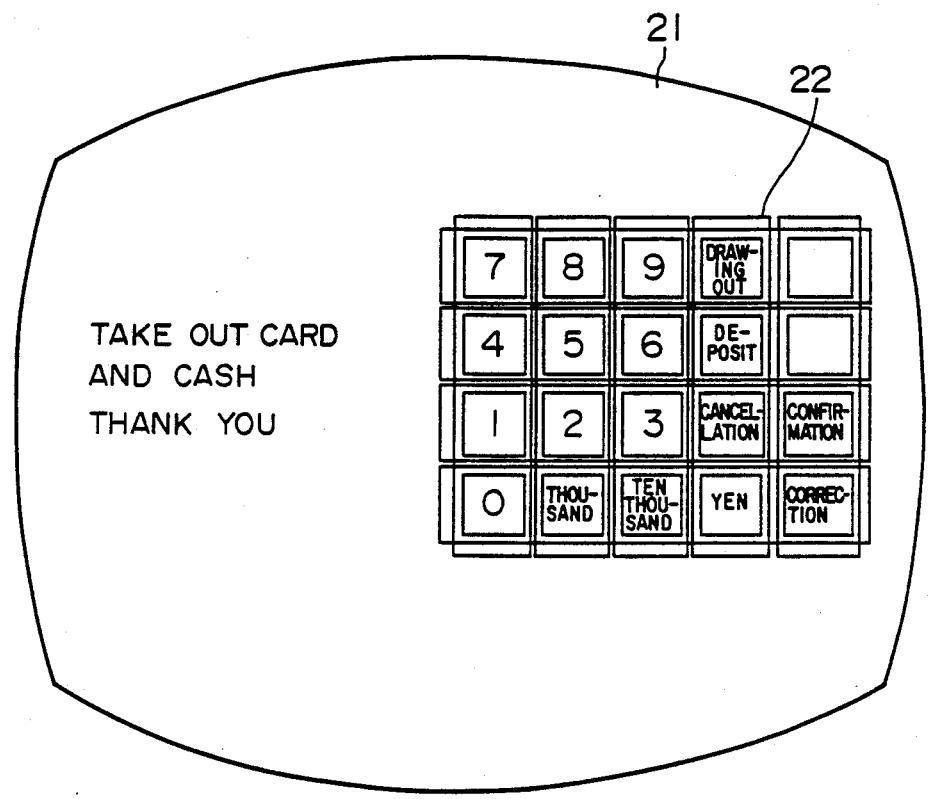

FIG. 3C represents the display on the screen 21 at the step, where the device puts out the cash and the magnetic card and calls the operators attention to take them.

In addition it is also possible to combine the blinking display with the change in the color of the effective keys, under the control of the controlling section 13 and the display controlling circuit 6.

The kind of the substantially transparent touch panel transmitting the information text and the arrangement of the keys on the screen of the CRT may be selected from known configuration such as light beam type panels, electro-static capacitance type and panels, the strain detection type panels.

I claim:

1. A touch panel input device provided with means for displaying an image including letters and with input keys superposed on the means for displaying and made of a transparent material, in which the image including letters is displayed at a position on the screen of a CRT display corresponding to an arrangement of the input keys, comprising:

means for displaying a part of the image that is displayed at a position corresponding to a subset of the input keys in a manner different from the remaining part of the image corresponding to input keys other than the subset of input keys, said subset of input keys including a number of input keys from which an operator is to make a selection;

wherein the part of the image that is displayed at a position corresponding to the subset of input keys is displayed with greater emphasis, before an operator pushes down one of the keys, than a remaining part of the image corresponding to input keys which are not included in said subset, so that the operator can recognize the part of the image corresponding to the subset of input keys easier than said remaining part of the image.

2. A touch panel input device according to claim 1, wherein said display means includes means for blinking the part of image corresponding to the subset of input keys, which are objects to be pushed down, until the operator pushes down one of that subset.

3. A touch panel input device according to claim 1, wherein said display means includes means for varying the color of the part of the image corresponding to the subset of keys, which are objects to be pushed down, into one different from that for said remaining part of image corresponding to the other keys, until the operator pushes down one of them.

4. A touch panel input device comprising:

(a) a display device displaying an operation manual for an operator and an arrangement of keys to be pushed down;

(b) a touch panel disposed on the surface of said display device and made of a substantially transparent material said touch panel detecting a push down operation by the operator; and (c) means for controlling the display of said operation manual by indicating on said display device an operation to be selected by the operator and a plurality of keys, whereby a touch panel portion corresponding to one of said plurality of keys should be pushed down according to the displayed operation manual, wherein said means for controlling the display of said operation manual includes means for emphasizing, under said transparent touch panel, a subset part of said display device prior to an operator's selection of an operation, said subset part of said display device being determined according to a sequential step of said displayed operation manual.

5. A touch panel input device according to claim 4, wherein said means for emphasizing includes means for blinking the subset of said display part of the keys.

6. A touch panel input device according to claim 4, wherein said means for emphasizing includes means for varying the form of a frame enclosing each of the letters in the subset of said display part.

7. A touch panel input device according to claim 4, wherein said means for emphasizing includes means for enlarging the letters in the subset of said display part.

8. A touch panel input device according to claim 4, wherein said means for emphasizing includes means for varying the color of the letters in the subset of said display part.

9. An automatic transaction machine including a display device that displays an operation manual for an operator and a plurality of keys, which keys are objects to be pushed down according to said operation manual and further including a touch panel superposed on the surface of said display device and made of a substantially transparent material for detecting a push down operation by the operator, said machine comprising:

means for emphasizing a subset of said plurality of keys prior to a selection of a key by an operator, said subset of keys being defined according to said operation manual, and for changing the subset of keys to an original display after the operation has pushed down one of the keys.

10. An automatic transaction machine according to claim 9, wherein said display means comprises means for disposing said plurality of keys within the display of said operation manual.

11. A touch panel input device provided with means for displaying an image that includes letters and also provided with a plurality of input keys superposed on the means for displaying, said input keys being made of a transparent material, and a subset of said input keys being effective for a designated operation wherein in such a touch panel input device the image is displayed at a position corresponding to an arrangement of the input keys on the screen of a CRT display device, said device comprising:

means for displaying a part of the image that corresponds to those keys of the subset of said input keys which are effective for a designated operation, in a manner different from that for a remaining part of the image that corresponds to input keys which are not included in said subset of keys, wherein the part of image corresponding to the subset of input keys is displayed on the screen of the CRT display device with greater emphasis before an operator pushes down one of the keys than that of the remaining part of the image corresponding to the input keys which are not included in the subset, so that the operator can easily recognize the effective input keys.

12. A touch panel input device according to claim 11, wherein said means for displaying includes means for blinking the part of the image corresponding to the subset of input keys, until the operator pushes down one of those keys.

13. A touch panel input device according to claim 11, wherein said means for displaying includes means for varying a color of the part of the image corresponding to the subset of input keys, into a color different from that for the remaining part of the image that corresponds to input keys not included in said subset until the operator pushes down one of the input keys of said subset.

* * * * *